(12) United States Patent
Sundstrom et al.

(10) Patent No.: US 10,230,482 B2
(45) Date of Patent: *Mar. 12, 2019

(54) RADIO TRANSCEIVER

(71) Applicant: Telefonaktiebolaget LM Ericsson (publ), Stockholm (SE)

(72) Inventors: Lars Sundstrom, Sodra Sandby (SE); Sven Mattison, Bjarred (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,275

(22) Filed: Jul. 4, 2017

(65) Prior Publication Data

US 2017/0302393 A1 Oct. 19, 2017

Related U.S. Application Data

(63) Continuation of application No. 14/432,597, filed as application No. PCT/EP2013/070545 on Oct. 2, 2013, now Pat. No. 9,729,263.
(Continued)

(30) Foreign Application Priority Data

Oct. 4, 2012 (EP) .................................... 12187189

(51) Int. Cl.
*H04J 4/00* (2006.01)
*H04B 1/3805* (2015.01)
(Continued)

(52) U.S. Cl.
CPC .............. *H04J 4/00* (2013.01); *H04B 1/3805* (2013.01); *H04B 1/52* (2013.01); *H04L 5/26* (2013.01);
(Continued)

(58) Field of Classification Search
CPC ........... H04J 4/00; H04L 5/26; H04W 76/023; H04W 72/0453; H04W 76/14; H04B 1/52; H04B 1/3805
See application file for complete search history.

(56) References Cited

U.S. PATENT DOCUMENTS 5,881,369 A 3/1999 Dean et al.
6,721,544 B1 * 4/2004 Franca-Neto ............ H04B 1/52
333/172
(Continued)

OTHER PUBLICATIONS

PCT International Search Report, dated Jan. 14, 2014, in connection with International Application No. PCT/EP2013/070545, all pages.
(Continued)

*Primary Examiner* — Raj Jain
*Assistant Examiner* — Chuong M Nguyen
(74) *Attorney, Agent, or Firm* — Leffler Intellectual Property Law, PLLC

(57) ABSTRACT

A radio transceiver circuit for FDD communication is disclosed. It comprises a transmitter for FDD signal transmission in a first frequency band, a first receiver for FDD signal reception in a second frequency band, separate from the first frequency band, and a duplexer. An output port of the transmitter is operatively connected to a first port of the duplexer for transmitting, through the duplexer, signals in said first frequency band. An input port of the first receiver is operatively connected to a second port of the duplexer for receiving, through the duplexer, signals in said second frequency band. The radio transceiver circuit comprises a second receiver, separate from the first receiver, for reception in said first frequency band. An input port of the second receiver is operatively connected to said first port of the duplexer for receiving, through the duplexer, signals in said first frequency band. A related radio communication apparatus is also disclosed.

13 Claims, 2 Drawing Sheets

Related U.S. Application Data

(60) Provisional application No. 61/711,944, filed on Oct. 10, 2012.

(51) Int. Cl.
*H04B 1/52* (2015.01)
*H04L 5/26* (2006.01)
*H04W 72/04* (2009.01)
*H04W 76/14* (2018.01)

(52) U.S. Cl.
CPC ....... *H04W 72/0453* (2013.01); *H04W 76/14* (2018.02)

(56) References Cited

U.S. PATENT DOCUMENTS

| | | | |
|---|---|---|---|
| 9,729,263 B2* | 8/2017 | Sundstrom | H04W 76/14 |
| 2004/0189526 A1* | 9/2004 | Frank | H04B 1/0057 |
| | | | 343/700 MS |
| 2006/0121937 A1* | 6/2006 | Son | H04B 1/0053 |
| | | | 455/553.1 |
| 2007/0280338 A1* | 12/2007 | Haub | H04B 1/30 |
| | | | 375/222 |
| 2008/0069063 A1* | 3/2008 | Li | H04W 88/06 |
| | | | 370/338 |
| 2008/0113628 A1 | 5/2008 | Muhammad et al. | |
| 2009/0206945 A1* | 8/2009 | Wagner | G01S 7/034 |
| | | | 333/101 |
| 2010/0157858 A1 | 6/2010 | Lee et al. | |
| 2014/0038667 A1* | 2/2014 | Little | H04B 1/006 |
| | | | 455/553.1 |
| 2014/0247802 A1* | 9/2014 | Wijting | H04W 72/0453 |
| | | | 370/329 |

OTHER PUBLICATIONS

PCT Written Opinion, dated Jan. 14, 2014, in connection with International Application No. PCT/EP2013/070545, all pages.

International Preliminary Report on Patentability, dated Sep. 30, 2014, in connection with International Application No. PCT/EP2013/070545, all pages.

Fodor, G. et al. "Design aspects of network assisted device-to-device communications" IEEE Communications Magazine, Mar. 2012, pp. 170-177.

\* cited by examiner

RADIO TRANSCEIVER

CROSS-REFERENCE TO RELATED APPLICATIONS

This application claims the benefit of U.S. application Ser. No. 14/432,597 filed Mar. 31, 2015, which is a 35 U.S.C. § 371 national stage of international application PCT/EP2013/070545 filed Oct. 2, 2013, which claims priority under 35 U.S.C. § 119 to European Patent Application No. 12187189.1, filed Oct. 4, 2012; and which also claims the benefit of U.S. Provisional Application No. 61/711,944, filed Oct. 10, 2012. All of these earlier applications are hereby incorporated herein by reference in their entireties.

TECHNICAL FIELD

The present invention relates to a radio transceiver circuit and a radio communication apparatus comprising the radio transceiver circuit.

BACKGROUND

Cellular communication systems are becoming increasingly more important. In such cellular communication systems, a user equipment (UE), such as a mobile phone or cellular computer modems, connects wirelessly to the network via base stations (BSs), that in turn are connected to a backhaul network for forwarding the communication from the user equipment.

An example of such a cellular communication system is the 3GPP (3rd Generation Partnership Project) Long Term Evolution (LTE) system, in the following referred to simply as "LTE". In LTE, multiple access is achieved using OFDMA (Orthogonal Frequency Division Multiple Access), in which different resource blocks (RBs) can be reserved for different UEs. An RB is built up by a number of sub carriers of an OFDM (Orthogonal Frequency Division Multiplexing) signal during a certain time interval. Duplex communication between a UE and a base station can be accomplished using frequency division duplex (FDD), wherein signals are sent from the UE to the BS in an up-link (UL) frequency band and signals are sent from the BS to the UE in a down-link (DL) frequency band (separate and disjoint from the UL frequency band).

In order to better utilize the resources of a cellular communication system, it has been suggested that UEs may engage in so called device-to-device (D2D) communication, wherein the UEs communicate data directly between them, i.e. without sending the data via the cellular communication network. Such D2D communication may be possible when two UEs are in the proximity of each other. Some aspects of D2D communication are briefly discussed in G Fodor et al, "Design aspects of network assisted device-to-device communications", IEEE Communications Magazine, pp 170-177, March 2012.

In general (for example for UEs for cellular communication systems capable of D2D communication), there is a desire to develop radio transceiver circuitry that can be manufactured and/or operated at a relatively low cost, such as in terms of circuit area, component count, and/or power consumption. For example, it is generally desired that the bill-of-material associated with introducing support of additional features (such as D2D communication) is kept relatively low.

SUMMARY

According to a first aspect, there is provided radio transceiver circuit for frequency division duplex (FDD) communication. The radio transceiver circuit comprises a transmitter for FDD signal transmission in a first frequency band, a first receiver for FDD signal reception in a second frequency band, separate from the first frequency band, and a duplexer. An output port of the transmitter is operatively connected to a first port of the duplexer for transmitting, through the duplexer, signals in said first frequency band. An input port of the first receiver is operatively connected to a second port of the duplexer for receiving, through the duplexer, signals in said second frequency band. The radio transceiver circuit comprises a second receiver, separate from the first receiver, for reception in said first frequency band. An input port of the second receiver is operatively connected to said first port of the duplexer for receiving, through the duplexer, signals in said first frequency band.

The radio transceiver circuit may comprise a first switch operatively connected between the first port of the duplexer and the output port of the transmitter for connecting the transmitter to the duplexer when the transmitter is to transmit said signals in said first frequency band and disconnecting the transmitter from the duplexer when the second receiver is to receive said signals in said first frequency band.

The radio transceiver circuit may comprise a second switch operatively connected between the first port of the duplexer and the input port of the second receiver for connecting the second receiver to the duplexer when the second receiver is to receive said signals in said first frequency band and disconnecting the second receiver from the duplexer when the transmitter is to transmit said signals in said first frequency band.

The radio transceiver circuit may be suitable for use in a user equipment for a cellular communication network. Said FDD communication may include communication with a network node of the cellular communication network. Said second receiver may be adapted for direct device-to-device (D2D) communication between said user equipment and another user equipment of said cellular communication network. Said cellular communication network may e.g. be a long-term evolution (LTE) cellular communication network.

The radio transceiver circuit may have a time division duplex (TDD) mode, wherein the transmitter and the second receiver operate according to a TDD scheme.

The first receiver and the second receiver may be adapted to simultaneously receive signals in the second and the first frequency band, respectively.

According to a second aspect, there is provided a radio communication apparatus comprising the radio transceiver circuit according to the first aspect. The radio communication apparatus may e.g. be a user equipment for a cellular communication network. The cellular communication network may e.g. be an (LTE) cellular communication network.

Further embodiments are defined in the dependent claims. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
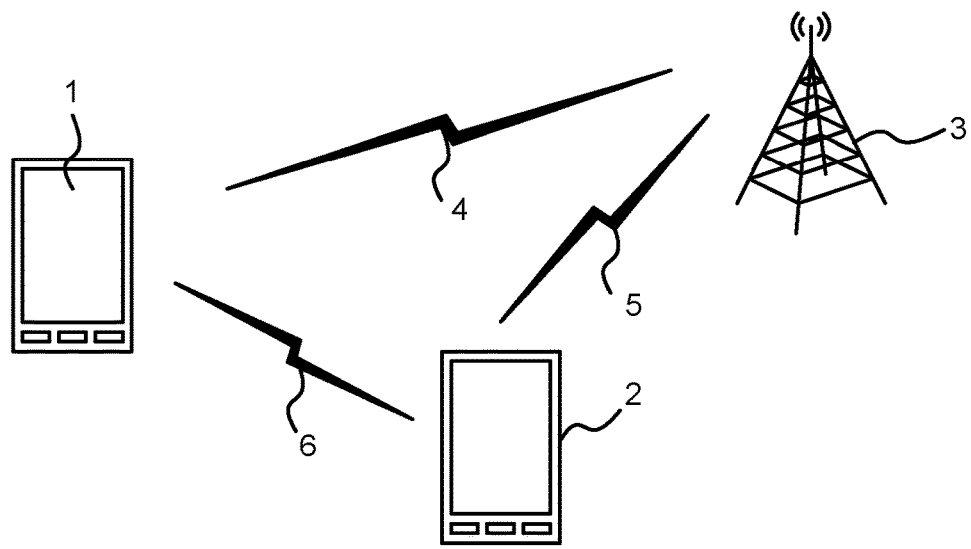
FIG. 1 schematically illustrates part of a cellular communication system.

FIG. 1 illustrates schematically an environment where embodiments of the present invention may be employed. A first UE 1 and a second UE 2 are in communication with a network node 3 (e.g. a BS) of a cellular communication system via wireless communication links 4 and 5, respectively. In addition, the UEs 1 and 2 may communicate directly with each other using a D2D link 6. An LTE communication system is considered as an example throughout this description, and in particular from the view point of the first UE 1 (that is, reference is made in the text to the first UE 1, even though the same considerations might apply to other UEs, such as the second UE 2, as well). However, embodiments of the present invention may be utilized in other systems as well.

Either the UL frequency band or the DL frequency band may be used for D2D communication. However, there are some advantages of using the UL frequency band. For example, if the DL frequency band is used for D2D communication, this means that the UE 1 transmits also in the DL frequency band. The received signal power at the UE 1 from the network node 3 in the DL frequency band might be relatively low (e.g. depending on the distance between the UE 1 and the network node), and thus the signal transmitted by the UE 1 in the DL frequency band might act as a blocker for the signals received from the network node 3 at the first UE 1 (and also for signals received at other UEs from the network node 3). This problem is alleviated if the UL frequency band is used instead.

Figure 2:
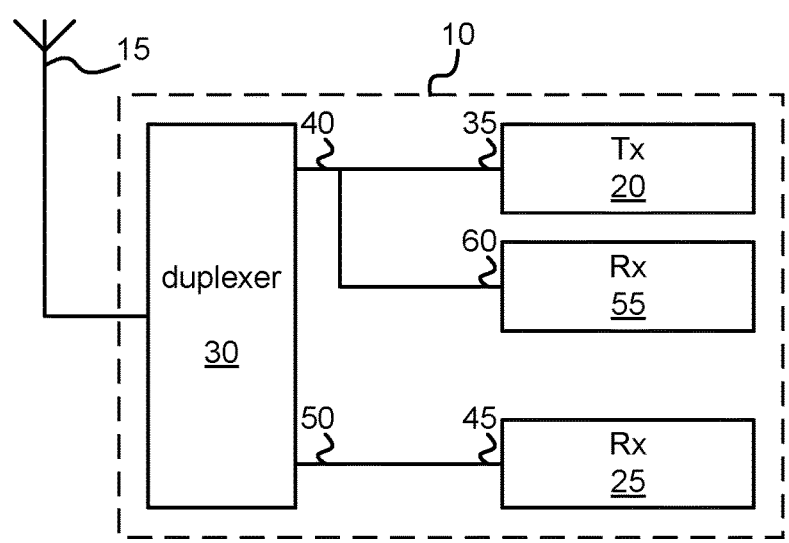
FIGS. 2-5 are simplified block diagrams of embodiments of a radio transceiver circuit.

The inventors have realized that a particularly efficient transceiver design can be employed in this scenario. FIG. 2 illustrates a simplified block diagram of a radio transceiver circuit 10 for FDD communication (e.g. with a network node, such as the network node 3 in FIG. 1) according to an embodiment of the present invention. The transceiver circuit 10 may e.g. be comprised in the first UE 1 and/or the second UE 2 (FIG. 1). FIG. 2 also shows an antenna 15 connected to the radio transceiver circuit 10. Although a single antenna 15 is used for illustration in FIG. 2, multiple antennas may be used as well.

In FIG. 2, the transceiver circuit 10 comprises a transmitter 20 for FDD signal transmission in a first frequency band (such as the aforementioned UL frequency band). Furthermore, in FIG. 2, the transceiver circuit 10 comprises a first receiver 25 for FDD signal reception in a second frequency band (such as the aforementioned DL frequency band), separate from the first frequency band. Moreover, in FIG. 2, the transceiver circuit 10 comprises a duplexer (or "duplex filter") 30. The duplexer 30 isolates the transmitter 20 and the first receiver 25, and allows them to be connected to a same antenna (e.g. the antenna 15 in FIG. 2). The design of duplexers are known in the art and therefore not further described in this description. An output port 35 of the transmitter 20 is operatively connected to a first port 40 of the duplexer 30 for transmitting, through the duplexer 30, signals in said first frequency band. Furthermore, an input port 45 of the first receiver 25 is operatively connected to a second port 50 of the duplexer 30 for receiving, through the duplexer 30, signals in said second frequency band.

So far in the description, the transceiver circuit 10 resembles a conventional FDD transceiver circuit. However, the transceiver circuit 10 of FIG. 2 further comprises a second receiver 55 for reception in said first frequency band. The second receiver 55 is separate from the first receiver 25. By separate it is meant that it is not the same receiver as the first receiver 25, although it may share one or more components, e.g. baseband processing circuitry. An input port 60 of the second receiver 55 is operatively connected to said first port 40 of the duplexer 30 for receiving, through the duplexer 30, signals in said first frequency band. Thus, in the context of a D2D capable UE of a cellular communication system such as LTE, the second receiver 55 may be used for reception of D2D signals from another UE (e.g. the second UE 2 in FIG. 1). It should be noted in FIG. 2 that the introduction of the second receiver 55 does not require any additional duplexer, but the duplexer 30 can be "reused" also for the second receiver 55, which is an advantage.

For the communication in the second frequency band, the radio transceiver circuit 10 may have having a time division duplex, TDD, mode. In this TDD mode, the transmitter 20 and the second receiver 55 operate according to a TDD scheme.

Measures may need to be taken in order for the transmitter 20 and the second receiver 55 not to interfere with each other, since they are operatively connected to the same port 40 of the duplexer 30. The transmitter 20 and the second receiver 55 may e.g. be put in states where they do not significantly affect each others operation. For example, the radio transceiver circuit 10 may be designed such that the transmitter 20 has an off state, which is used when the second receiver 55 is to receive signals in the first frequency band, and an on state, which is used when the transmitter 20 is to transmit signals in the first frequency band. The transmitter 20 may be designed to have a high output impedance (ideally infinite, although that is not achievable in practice) in the off state, whereby the transmitter 20 does not affect the received signal, or only affects it negligibly. Furthermore, the transmitter 20 may be designed to have a well-defined output impedance in the on-state, such that it can be suitably matched with the duplexer 30 and antenna 15. Moreover, the radio transceiver circuit 10 may be designed such that the second receiver 55 has an on state, which is used when the second receiver 55 is to receive signals in the first frequency band, and an off state, which is used when the transmitter 20 is to transmit signals in the first frequency band. The second receiver 55 may be designed to have a high input impedance (ideally infinite, although that is not achievable in practice) in the off state, whereby the second receiver 55 does not affect the transmitted signal, or only affects it negligibly. Furthermore, the second receiver 55 may be designed to have a well-defined input impedance in the on-state, such that it can be suitably matched with the duplexer 30 and antenna 15. Under such circumstances, the second transceiver 55 and the transmitter 20 can be directly connected to the first port 40 of the duplexer, as indicated in FIG. 2. The meaning of the terms "high" and "well defined" input or output impedance (i.e. "how high" and "within what tolerances") should be considered on a case-by-case basis, e.g. using computer simulations, to determine when a given system specification is met. Performing such simulations is considered a straight-forward task for a person skilled in the art of radio-transceiver design. It should also be noted that a high input or output impedance is only an example. For example, a transmitter 20 having an off-state with a low output impedance, that is transformed to a high impedance e.g. over a quarter-wave length transmission line, can be used as well.

Figure 3:
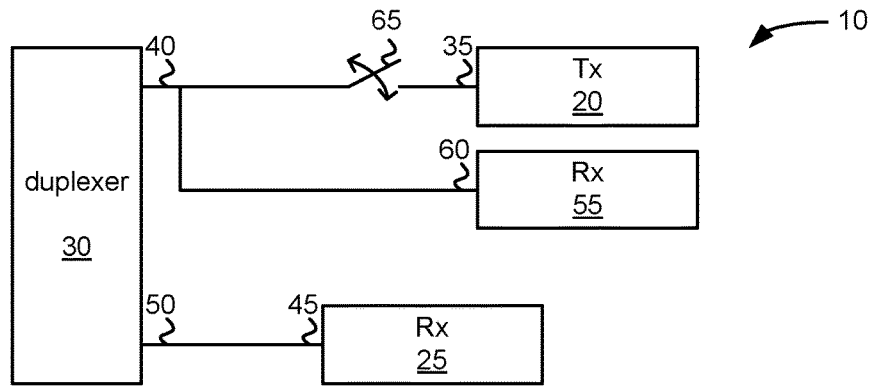

Alternatively, one ore more switches may be used to facilitate the transmitter 20 and the second receiver 55 sharing the same duplexer port 40. FIG. 3 shows an embodiment, wherein the radio transceiver circuit 10 comprises a first switch 65 operatively connected between the first port 40 of the duplexer 30 and the output port 35 of the transmitter 20. The first switch 65 can be closed for connecting the transmitter 20 to the duplexer 30 when the transmitter 20 is to transmit signals in said first frequency band. Furthermore, the first switch 65 can be opened for disconnecting the transmitter 20 from the duplexer 30 when the second receiver 55 is to receive said signals in said first frequency band. Hence, by means of the first switch 65, a transmitter 20 without high output impedance in an off-state can be used. In the embodiment illustrated in FIG. 3, the second receiver 55 may have the on and off states described above.

Figure 4:
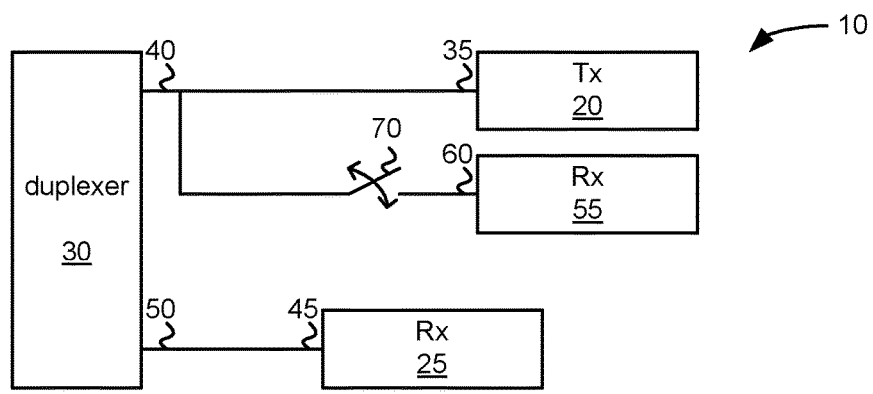

Similarly, FIG. 4 shows an embodiment, wherein the radio transceiver circuit 10 comprises a second switch 70 operatively connected between the first port 40 of the duplexer 30 and the input port 60 of the second receiver 55. The second switch 70 can be closed for connecting the second receiver 55 to the duplexer 30 when the second receiver 55 is to receive said signals in said first frequency band. Furthermore, the second switch 70 can be opened for disconnecting the second receiver 55 from the duplexer 30 when the transmitter 20 is to transmit said signals in said first frequency band. Hence, by means of the second switch 70, a second receiver 55 without high input impedance in an off-state can be used. In the embodiment illustrated in FIG. 4, the transmitter 20 may have the on and off states described above.

Figure 5:
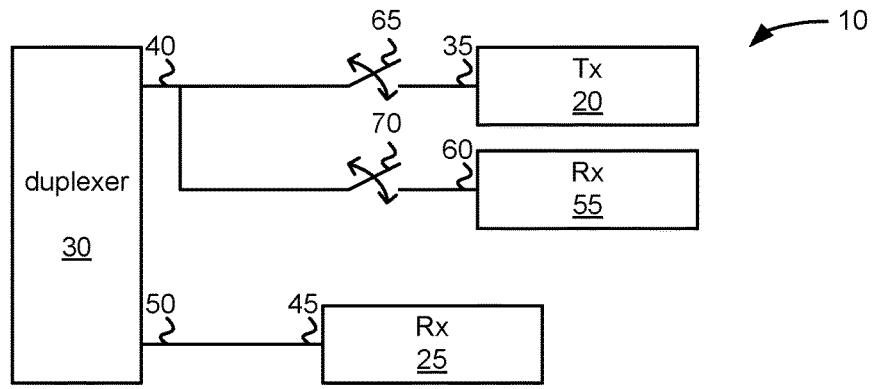

FIG. 5 shows an embodiment including both the first switch 65 (as in FIG. 3) and the second switch 70 (as in FIG. 4). This embodiment facilitates the use of a transmitter 20 without high output impedance in an off-state in combination with a second receiver 55 without high input impedance in an off-state.

According to some embodiments, the first receiver 25 and the second receiver 55 are adapted to simultaneously receive signals in the second and the first frequency band, respectively. In the LTE scenario used as an example in this description, this allows simultaneous reception of D2D communication (in the cellular UL frequency band) and cellular communication (in the cellular DL frequency band).

As indicated above, the radio transceiver circuit 10 may e.g. be used in a UE (e.g. the UE 1 in FIG. 1) of a cellular communication network, such as an LTE network. Said FDD communication may then e.g. include communication with a network node of the cellular communication network. A network node in this context may e.g. be what is commonly referred to as a BS, an eNodeB, pico base station, macro base station, relay node, etc. Furthermore, a UE in this context may e.g. be a mobile phone, a cellular data modem, a personal computer or other equipment comprising such a cellular data modem. Moreover, as also indicated above, the second receiver 55 may be adapted for direct D2D communication between said UE and another UE (e.g. UE 2 in FIG. 1) of said cellular communication network.

D2D communication is described above to operate in a TDD mode. This is, however, only an example. According to some embodiments, the transmitter 20 and second receiver 55 may be configured individually to operate on any carrier within the frequency band corresponding to the pass-band associated with the first port 40 of the duplexer. In one such embodiment, the UE 1 is adapted to be able to operate on several carriers simultaneously within the same frequency band using so called Carrier Aggregation, wherein the UEs engaged in D2D communication transmit and receive the D2D traffic on different carriers within the same frequency band. In yet another embodiment, the UE 1 is adapted to operate in two different frequency bands, wherein the UEs engaged in D2D communication transmit and receive the D2D traffic in different frequency bands. Such UEs may e.g. comprise several radio transceiver circuits 10 according to embodiments of the present invention.

The present invention has been described above with reference to specific embodiments. However, other embodiments than the above described are possible within the scope of the invention. For example, embodiments of the radio transceiver circuit 10 may be advantageously used in other types of radio communication apparatuses than user equipment for cellular communication networks as well. The different features of the embodiments may be combined in other combinations than those described. The scope of the invention is only limited by the appended patent claims.

The invention claimed is:

1. A radio communication apparatus comprising:
   a duplexer;
   a transmitter configured to transmit, through the duplexer, signals in a first frequency band via a first port of the duplexer;
   a first receiver configured to receive, through the duplexer, signals in a second frequency band, different from the first frequency band, via a second port of the duplexer; and a second receiver, different from the first receiver, configured to receive, through the duplexer, signals in said first frequency band via the first port of the duplexer; and
   a first switch connected in a path between the first port of the duplexer and an output port of the transmitter for connecting the transmitter to the duplexer when the transmitter is to transmit said signals in said first frequency band and disconnecting the transmitter from the duplexer when the second receiver is to receive said signals in said first frequency band.

2. The radio communication apparatus of claim 1, comprising a second switch connected in a path between the first port of the duplexer and an input port of the second receiver for connecting the second receiver to the duplexer when the second receiver is to receive said signals in said first frequency band and disconnecting the second receiver from the duplexer when the transmitter is to transmit said signals in said first frequency band.

3. The radio communication apparatus of claim 1, being a user equipment for a cellular communication network.

4. The radio communication apparatus of claim 3, wherein said second receiver is configured to communicate between said user equipment and another user equipment of said cellular communication network via a direct device-to-device communication link.

5. The radio communication apparatus of claim 3, wherein said cellular communication network is a long-term evolution (LTE) cellular communication network.

6. The radio communication apparatus of claim 1, having a time division duplex (TDD) mode, wherein the transmitter and the second receiver operate according to a TDD scheme.

7. The radio communication apparatus of claim 1, wherein the first receiver and the second receiver are adapted to simultaneously receive signals in the second frequency band and the first frequency band, respectively.

8. A radio communication apparatus comprising:
   a duplexer;

a transmitter configured to transmit, through the duplexer, signals in a first frequency band via a first port of the duplexer;

a first receiver configured to receive, through the duplexer, signals in a second frequency band, different from the first frequency band, via a second port of the duplexer;

and a second receiver, different from the first receiver, configured to receive, through the duplexer, signals in said first frequency band via the first port of the duplexer; and a second switch connected in a path between the first port of the duplexer and an input port of the second receiver for connecting the second receiver to the duplexer when the second receiver is to receive said signals in said first frequency band and disconnecting the second receiver from the duplexer when the transmitter is to transmit said signals in said first frequency band.

9. The radio communication apparatus of claim 8, being a user equipment for a cellular communication network.

10. The radio communication apparatus of claim 9, wherein said second receiver is configured to communicate between said user equipment and another user equipment of said cellular communication network via a direct device-to-device communication link.

11. The radio communication apparatus of claim 9, wherein said cellular communication network is a long-term evolution (LTE) cellular communication network.

12. The radio communication apparatus of claim 8, having a time division duplex (TDD) mode, wherein the transmitter and the second receiver operate according to a TDD scheme.

13. The radio communication apparatus of claim 8, wherein the first receiver and the second receiver are adapted to simultaneously receive signals in the second frequency band and the first frequency band, respectively.

* * * * *

UNITED STATES PATENT AND TRADEMARK OFFICE
CERTIFICATE OF CORRECTION

PATENT NO. : 10,230,482 B2  
APPLICATION NO. : 15/641275  
DATED : March 12, 2019  
INVENTOR(S) : Sundstrom et al.

Page 1 of 1

It is certified that error appears in the above-identified patent and that said Letters Patent is hereby corrected as shown below:

In the Specification

In Column 1, Line 7, delete "2015," and insert -- 2015, now Pat. No. 9,729,263, --, therefor.

In Column 4, Line 19, delete "have having" and insert -- have --, therefor.

In Column 4, Line 54, delete "second transceiver" and insert -- second receiver --, therefor.

In Column 5, Line 1, delete "one ore" and insert -- one or --, therefor.

Signed and Sealed this  
Twentieth Day of August, 2019

Andrei Iancu  
*Director of the United States Patent and Trademark Office*